No. 740,551. PATENTED OCT. 6, 1903.
W. C. GILLESPIE.
DENTAL CUTTING TOOL.
APPLICATION FILED MAR. 23, 1903.
NO MODEL.
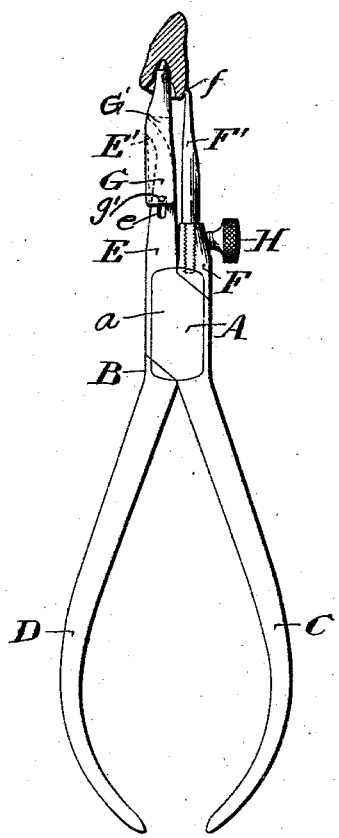
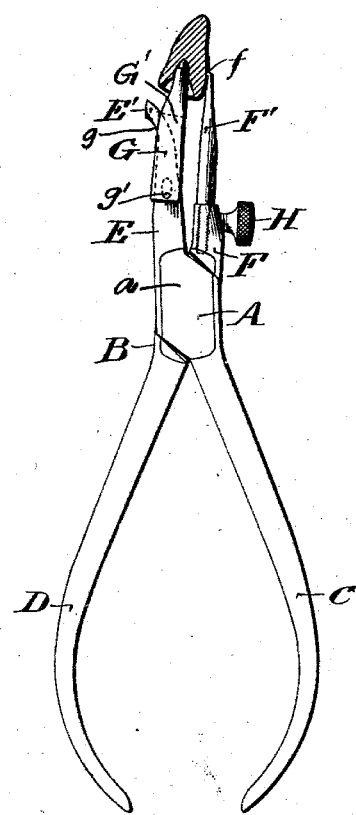
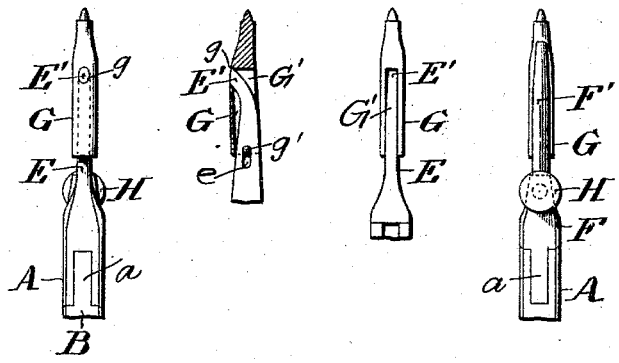
WITNESSES: INVENTOR:
William C. Gillespie,
by Edward F. Simpson Jr.
Attorney.

No. 740,551. Patented October 6, 1903.

UNITED STATES PATENT OFFICE.

WILLIAM COCHRAN GILLESPIE, OF NASHVILLE, TENNESSEE, ASSIGNOR TO NORRIS C. LEONARD, OF NASHVILLE, TENNESSEE.

DENTAL CUTTING-TOOL.

SPECIFICATION forming part of Letters Patent No. 740,551, dated October 6, 1903.

Application filed March 23, 1903. Serial No. 149,180. (No model.)

*To all whom it may concern:*

Be it known that I, WILLIAM COCHRAN GILLESPIE, a citizen of the United States, residing in Nashville, in the county of Davidson and State of Tennessee, have invented a certain new and useful Improvement in Dental Cutting-Tools; and I do hereby declare the following to be a full, clear, and exact description of the invention, such as will enable others skilled in the art to which it appertains to make and use the same.

My invention relates to a dental implement for performing various cutting or scraping operations and is particularly applicable to that class of implements known in the art as "root reducers or trimmers," used for reducing, trimming, or shaping the roots of natural teeth in the human mouth to prepare them for the reception of artificial crowns.

The object of my invention is to provide an implement of this character simple in construction, efficient in operation, and easily manipulated.

My improved dental cutter is plier-like in form, and one of its jaws is provided with an operating-tool, while its other jaw serves as a fulcrum, the parts being so constructed and related to each other that when in operation the respective jaws are forced together one of them is caused to move longitudinally with respect to the other, whereby the cutting or scraping action of the operating-tool is effected.

While my improvement is obviously applicable to a wide variety of dental cutting and scraping appliances, I have herein indicated it as embodied only in an implement designed especially for reducing tooth-roots.

In the accompanying drawings, Figure 1 is a side view of said root-reducer, indicating it in a position upon a tooth-root with the operating-tool about to commence its cutting or scraping action. Fig. 2 is a similar view indicating the operating-tool as having completed a cutting or scraping stroke. Fig. 3 is a side view of the implement looking toward the operating-tool and with the handles broken away. Fig. 4 is a similar view looking toward the fulcrum-jaw. Fig. 5 is a central sectional view of the fulcrum-jaw. Fig. 6 is an inner edge view of the fulcrum-jaw.

The root-reducer indicated in the drawings consists of two members A B, pivoted together at $a$, similar to ordinary pliers, and having handles C D and jaws E F. The jaw E, herein designated the "fulcrum-jaw," is provided with a pointed fulcrum-piece G, the connection between which and said jaw being of such a nature that said fulcrum-piece is movable toward and away from the opposite jaw, as well as longitudinally. This compound movement of the fulcrum-piece is accomplished by means of a sliding inclined-plane or cam-like connection, which in the implement illustrated in the drawings is constructed as follows: The jaw E is curved outwardly at E', as shown, and the fulcrum-piece is formed on its inner edge with a slot or recess G', extending lengthwise thereof. The curved jaw occupies said slot and also passes through an opening $g$, communicating therewith. A pin $g'$, passing through the fulcrum-piece and through an elongated slot $e$ in the jaw, serves to limit the movement of said fulcrum-piece and also to hold it upon said jaw. The opposite jaw F is provided with an operating-tool F', which may be of any desired form for accomplishing any particular operation. In the present instance the operating-tool is what is known as a "scaler." It is formed with a blade $f$ for cutting, scraping, scaling, or otherwise removing the tooth or root substance and is operated by a drawing or pulling action.

The range of usefulness of the implement may be increased by detachably connecting the operating-tool to its jaw, and for this purpose the shank of the tool may be threaded to screw into a threaded socket of the jaw. By this means different tools may be used interchangeably and the tools adjusted into various operating positions as desired. A set-screw H may be employed for securely locking the tool in position.

In operating the reducer the pointed end of the fulcrum-piece is seated in the root-canal with the operating-tool engaging the side of the root, as shown in Fig. 1. Pressure is then applied to the handles, and as the jaws are forced together the curved jaw is caused to slide on the fulcrum-piece, thus drawing the operating-point inward or toward the outer end of the root. The movement imparted to the operating-point is a compound one—that is, it is pressed into the root as well as drawn along the same, with the result of cutting away some of the root substance. After one such stroke has been made the jaws are separated, the implement slightly rotated about its fulcrum, and the operating-tool placed for a fresh stroke, as before. The operation is continued until the operating-tool has passed entirely around the root or until the root has been trimmed to the desired extent.

It will be evident that the essential movements secured by my improved cutting or scraping implement may also be attained by varying the form of the sliding inclined-plane or cam-like construction of the fulcrum-piece and that the other details of construction herein shown and described may likewise be varied without departing from the principle of my invention. It will be further evident, as already stated, that my improvement is not confined to that particular class of dental implements known as "root-reducers," but is applicable to various classes of dental cutting or scraping implements in which the peculiar movements afforded by my invention are desirable.

I claim as my invention—

1. The combination, in a dental cutting implement, of the members pivoted together and provided with handles, and also with jaws, one of said jaws having an operating-tool, and the other having a fulcrum-piece movably connected with said jaw, and means for causing one of said jaws to move longitudinally with respect to the other jaw when the two are forced together, substantially as set forth.

2. The combination, in a dental cutting implement, of the members pivoted together and provided with handles and also with jaws, one of said jaws having an operating-tool, the other jaw having a fulcrum-piece, and a sliding inclined-plane connection between said fulcrum-piece and the jaw to which it is connected, whereby when the jaws are forced together one of them is caused to move longitudinally with respect to the other, substantially as set forth.

3. The combination, in a dental cutting implement, of the members pivoted together and provided with handles and also with jaws, one of said jaws having an operating-tool, the other jaw being curved outwardly, and a pointed, slotted fulcrum-piece having a sliding inclined-plane connection with said jaw, substantially as and for the purpose set forth.

In testimony whereof I affix my signature in presence of two witnesses.

WM. COCHRAN GILLESPIE.

Witnesses:
JNO. W. CLAYTON,
N. C. LEONARD.